United States Patent [19]

Grebner et al.

[11] Patent Number: 5,435,988
[45] Date of Patent: Jul. 25, 1995

[54] CLATHRASIL OF THE DODECASIL 1 H STRUCTURAL TYPE HAVING A SMALL AVERAGE CRYSTAL SIZE

[75] Inventors: Michael Grebner, Mainz; Axel Reich, Schornsheim; Ferdi Schüth, Mainz; Klaus Unger, Seeheim-Jugenheim, all of Germany

[73] Assignee: Merck Patent Gesellschaft mit Beschrankter Haftung, Darmstadt, Germany

[21] Appl. No.: 24,962

[22] Filed: Mar. 2, 1993

[30] Foreign Application Priority Data

Mar. 2, 1992 [DE] Germany .................. 42 06 553.4

[51] Int. Cl.[6] .................. C01B 33/26; B01J 29/06
[52] U.S. Cl. .................. 423/706; 423/328.1; 423/328.2; 423/331; 423/333; 423/704; 423/709; 502/64
[58] Field of Search ............ 423/702, 709, 704, 328.2, 423/331, 333, 328.1, 704; 502/64

[56] References Cited

U.S. PATENT DOCUMENTS

| | | | |
|---|---|---|---|
| 4,173,622 | 11/1979 | Robertson | 423/789 |
| 4,175,114 | 11/1979 | Plank et al. | 423/329 |
| 4,199,556 | 4/1980 | Plank et al. | 423/329 |
| 4,526,878 | 7/1985 | Takegami et al. | 502/71 |
| 4,562,166 | 12/1985 | Valyocsik | 502/62 |
| 4,665,110 | 5/1987 | Zones | 502/61 |
| 4,714,601 | 12/1987 | Vaughan | 502/62 |
| 5,157,185 | 10/1992 | Chu et al. | 502/71 |

FOREIGN PATENT DOCUMENTS 2935123 4/1981 Germany .

*Primary Examiner*—Anthony Mc Farlane
*Attorney, Agent, or Firm*—Millen, White, Zelano & Branigan

[57] ABSTRACT

The invention relates to a process for the preparation of crystalline clathrasil of the dodecasil 1 H structural type having an average crystal size of not more than 20 μm, characterised in that an alkaline aqueous silicate-containing medium comprising templates and crystallisation seeds is heat-treated, the crystallisation seeds content, relative to the $SiO_2$ content of the medium, being not less than 1% by weight.

15 Claims, No Drawings

CLATHRASIL OF THE DODECASIL 1 H STRUCTURAL TYPE HAVING A SMALL AVERAGE CRYSTAL SIZE

BACKGROUND OF THE INVENTION

This application is copending with application No. 8/024,967, filed Mar. 2, 1993, now U.S. Pat. No. 5,368,836.

The invention relates to the clathrasil of the dodecasil 1 H structural type having a small average particle size, to platelet-like pigments based on such particles and to the corresponding preparation processes.

Clathrasils belong to the class of porous tectosilicates or porosils, which, according to H. Gies and B. Marler, Zeolites, 12 (1992), 42, can be described by the general formula

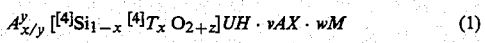

$$A^y_{x/y} [^{[4]}Si_{1-x} {}^{[4]}T_x O_{2+z}]UH \cdot vAX \cdot wM \quad (1)$$

in which A is a cation of charge y, T is a trivalent cation which is coordinated tetrahedrally by 4 oxygen atoms, z is the number of additional oxygen atoms for compensating for lattice interruptions, AX are ion pairs and M are guest particles and u, v and w are 0, 1, 2. Examples of suitable cations A are alkali metal ions or alkaline earth metal ions, T can be, for example, an aluminum cation or a boron cation, and, as X, a large number of anions, such as, for example, OH, halogen, and the like are suitable. The alkali metal and alkaline earth metal ions serve for the charge compensation of the aluminum and boron cations. Na is a preferred alkali metal ion and Ca is a preferred alkaline earth metal ion. The guest particles, which are also designated as templates, are incorporated in the interstices of the porosil structure of the porosils during their synthesis. The guest particles are in general neutral molecules, although, in particular in the case of charges porosil structures, other charges guest particles can sometimes also be incorporated, i.e., to

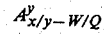

$$A^y_{x/y} = W/Q$$

in which W is the number of charged guest molecules and Q is the number of charges. In this case, the above formula (1) has to be modified accordingly.

Depending on the size and form of the interstices, porosils are divided into clathrasils and zeosils. While zeosils have cage- or channel-like pores which are large enough for the template molecules to be driven off from the pores under relatively mild conditions and, if desired, exchanged for other guest molecules, clathrasils have very small cage-like interstices whose openings are too small for any trapped molecule to leave the pore system. Clathrasils of the dodecasil 1 H type, which have a platelet-like, hexagonal structure, are of particular interest.

Hitherto, clathrasils have been prepared by hydrothermal crystallization at, for example, 200° C. from a silicate-containing solution to which template molecules, such as, for example, adamantylamine have been added. However, in this preparation process, crystals having an average size of typically 150–500 μm are formed. However, crystals of such a large size are not suitable for incorporation in paint formulations, coatings, and the like, and are moreover highly sensitive to cracking. Moreover, the template molecules used in excess in the customary synthesis processes are usually those whose dimensions correspond as closely as possible to the dimensions of the interstices in the dodecasil 1 H; examples which may be mentioned are: 1-adamantylamine, piperidine or azabicyclononanium iodide. However, the materials mentioned are relatively expensive and unsuitable for economical pigment preparation on an industrial scale.

Accordingly, there was a need for clathrasils of the dodecasil 1 H structural type having a small average crystal size of less than about 20 μm and for a corresponding economical preparation process which is suitable for industrial scale production.

SUMMARY OF THE INVENTION

An object of the invention was to provide lathrasils of the 1 H structural type and a process for their preparation which meet the requirements mentioned at least better than customary clathrasils of the dodecasil 1 H structural type and customary preparation processes. Further objects of the present invention are apparent to persons skilled in the art from the detailed description which follows.

It has been found that these objects can be achieved by providing the process according to the invention and the dodecasil 1 H clathrasils according to the invention.

Accordingly, the invention relates to a process for the preparation of crystalline clathrasil of the dodecasil 1 H structural type having an average crystal size of not more than 20 μm, characterized in that an alkaline aqueous silicate-containing medium comprising crystallisation seeds and template molecules is heat treated, the crystallization seeds content, relative to the $SiO_2$ content of the medium, being not less than 1% by weight.

Furthermore, the invention relates to dodecasil 1 H clathrasils having an average crystal size of not more than 20 μm and to platelet-like pigments based on such dodecasil 1 H clathrasils.

In the process according to the invention, one or more templates and crystallization seeds are added to the reaction batch, which is based on an alkaline aqueous silicate-containing medium.

The crystallization seeds used are in particular finely milled dodecasil 1 H clathrasil crystals which, for example, were obtained by customary preparation processes and may already contain templates. Milling of the dodecasil 1 H clathrasil crystals can take place, for example, in a vibrating mill, and the average particle size of the crystallisation seeds obtained is typically between 0.2 and 1.5 μm and in particular about 1 μm.

It has now been found that the size of the dodecasil 1 H clathrasil crystals obtained can be selectively influenced by the amount of seed crystals or crystallization seeds added. Whereas relatively small amounts of seed crystals of between about 1 and 10% by weight and in particular 5 and 10% by weight give dodecasil 1 H clathrasil crystals having an average particle size of between 5 and 15 μm, higher seed crystal concentrations of more than 10% by weight and in particular between 10 and 20% by weight give smaller crystals having an average particle size of typically less than 5 μm.

These dodecasil 1 H clathrasil crystals are hexagonal platelets having an average thickness of, typically, between 0.2 and 2 μm; accordingly, the ratio of lateral expansion to thickness, called the aspect ratio, of these dodecasil 1 H clathrasil crystals is typically between 1 and 100 and in particular between 10 and 100.

Furthermore, template molecules are added to the reaction batch, the template content of the reaction batch, relative to the number of moles of $SiO_2$, being typically between 0.03 and 2 and in particular between 0.5 and 1.5. If the template content selected is less than 3 mol %, extensively intergrown dodecasil 1 H clathrasil crystals, which in many cases cannot be separated even by milling without destroying the dodecasil 1 H platelets, are often obtained; these extensively intergrown dodecasil 1 H clathrasils are therefore in general not preferred for pigment preparation. The template content selected is particularly preferably more than 10 mol %, relative to the number of moles of $SiO_2$ in the reaction batch. An increase in the template concentrations to more than 100 mol % usually does not lead to any further improvement in the morphology of the dodecasil 1 H clathrasil platelets and is therefore normally ruled out simply for economic reasons.

Surprisingly, it has been found that unlike the customary synthesis of dodecasil 1 H clathrasil the selection of templates is much less critical. Thus, the templates used can be, for example, simple amines, such as, for example, hexamethylenediamine, simple quaternary ammonium compounds, such as, for example, triethylmethylammonium bromide, surfactants, such as, for example, sodium dodecylsulphate and furthermore also simple alcohols. This list is merely intended to illustrate the invention and not to limit it in any way; a large number of further molecules are suitable as template molecules, as would be known to one of ordinary skill in the art. The decisive factor is that in the preparation processes according to the invention the demands on the geometry of the template molecules are substantially lower than in customary processes. In the process according to the invention, the dodecasil 1 H clathrasil structure is obviously mainly induced by the seed crystals, the template molecules having a supporting effect. In contrast, the structure in the customary syntheses is induced and controlled solely by the template molecules, as a result of which it is understandable that the template molecule must predetermine the desired geometrical structure as accurately as possible.

It is true that in some cases the use of templates which do not fit exactly in terms of geometry gives intergrown dodecasil 1 H platelets. However, these deviations from perfect morphology are usually only relatively small, and the reaction products obtained can in general be treated by means of an ultrasound treatment without destroying the dodecasil 1 H platelets.

It is true that the use of crystallization seeds for the systhesis of zeolites is known (see, for example, DE 2,935,123 corresponding to U.S. Pat. Nos. 4,175,114 and 4,199,556), but the synthesis of dodecasil 1 H clathrasils with the addition of crystallization seeds has not been described in the prior art an in particular it has previously not been realized that the average size of the dodecasil 1 H clathrasil crystals can be selectively influenced by varying the concentration of the crystallisation seeds added and that by adding crystallization seeds selection of the template molecules becomes much less critical.

An economical synthesis of dodecasil 1 H clathrasil crystals on an industrial scale is only made possible at all by virtue of the last-mentioned fact.

The alkaline aqueous medium typically has an $NH_3$ content of 15 to 45 mol which is equal to the OH content assuming complete dissociation and an $H_2O$ content of 40 to 70 mol, both relative to the number of moles of $SiO_2$ of the medium. The required OH content or the corresponding pH is adjusted by adding a base, usually $NH_3$; the pH of the alkaline aqueous medium is preferably between 12 and 13. The ranges given for OH content, $H_2O$ content and pH are in general preferred, although values above and below these ranges are also possible.

The silicate source used can be in particular silica, but aqueous solutions of alkali metal silicates or aluminosilicates or even further silica sources are also possible.

The alkaline aqueous silicate-containing medium characterized above in more detail is then subjected to a heat treatment which gives the clathrasil crystals. The heating rate is preferably between 0.05 and 50 K./min and in particular between 0.1 and 20 K./min, and the final temperature is preferably selected between 400 and 470 K. and in particular between 423 and 453 K. The temperature can either be increased more or less linearly or, alternatively, complicated temperature programs in which the temperature during heating is kept constant, for example kept for some time at one or more intermediate values before being further increased, or other temperature programs can be used.

The selection of a suitable temperature program is guided by the idea that the clathrasil synthesis can roughly be divided into 2 phases, the first of which is nucleation and the second the attachment of monomers to a species capable of growth. Thus, if a low or relatively low seed crystal concentration is used, a relatively low heating rate and the use of temperature gradients are often preferred, whereas in the case of higher seed crystal concentrations it is often possible to heat at a higher rate. Furthermore, at low heating rates, the dodecasil 1 H clathrasil crystals in many cases have perfect morphology.

The adjustment of heating rate and heating program to the composition of the alkaline aqueous silicate-containing medium used in each case and optimization with respect to the desired crystal morphology and yield can be carried out by those skilled in the art easily and without any inventive step. The total duration of the heat treatment is preferably between 3 and 10 days, the medium preferably being maintained at the final temperature for 3 to 10 days.

The platelet-like dodecasil 1 H clathrasil crystals prepared by the process according to the invention can be used for the preparation of platelet-shaped effect pigments. For this purpose, the crystal platelets are suspended in an aqueous medium and coated by wet-chemical means with one or more compact smooth layers of highly refractive metal oxides, such as, for example, $TiO_2$, $ZrO_2$, ZnO, iron oxide, chromium oxide, using the processes described, for example, in German Patent Specifications and Patent applications Nos. 1,467,468, 1,959,998, 2,009,566, 2,214,545, 2,215,191, 2,244,298, 2,313,331, 2,522,572, 3,137,808, 3,137,809, 3,151,343, 3,151,354, 3,151,355, 3,211,602 and 3,235,017. The interstice openings of the dodecasil 1 H structure are 0.28 nm or smaller and are thus so small that they are scarcely filled by the metal hydroxide or metal oxyhydroxide deposits. As a result of the substantially reduced aspect ratio of such pigments compared with, for example, mica pigments, the nacreous effect of the pigments according to the invention is less pronounced, and the pigments according to the invention may be more aptly designated gleaming absorption pigments.

Furthermore, it has been found that the dodecasil 1 H clathrasil crystals are highly suitable as carriers of organic colorants. To this end, organic colorants, such as, for example, methylene blue, methyl orange, bromocresol purple, malachite green or phenol red are added to the reaction batch, this list being intended solely to illustrate the invention and not to limit it in any way. The colorant molecules selected must merely not be so large as not to fit in the interstices of the dodecasil 1 H clathrasil. Two types of interstices having an interstice opening of 0.28 nm are present in dodecasil 1 H, namely icosahedral and dodecahedral cages, which have an internal diameter of 1.12 nm. In addition, another type of dodecahedral cage having an even smaller interstice opening which consists of an SiO five-membered ring and has an internal diameter of 0.57 nm is present. Based on the cage geometry given, those skilled in the art can easily select organic colorants which can be incorporated.

During synthesis, the colorant molecules are incorporated in particular in the first-mentioned icosahedral and dodecahedral interstices having an interstice opening of 0.28 nm; in contrast, the smaller dodecahedral cages remain in many cases unoccupied. The narrow interstice openings of only 0.28 nm ensure that it is virtually impossible for the colorant molecules to leave the interstices, as a result of which the resulting inclusion pigments are highly colorfast and non-bleeding. Moreover, they are also extremely stable to oxidizing agents, since oxygen atoms cannot pass through the narrow interstice openings.

Since the template molecules and the colorant molecules compete during synthesis for the cage positions, the selected concentration of the template molecules is in general very low. The colorant molecules often act as structure-inducing templates, so that only a very low template concentration or no further addition of template is required. The quotient of the amount of template and the addition of colorant molecules is preferably between 0 and 0.5 and in particular between 0 and 0.2. The colorfulness can also be obtained by calcining of crystals loaded with colorless molecules. Relatively definite pyrolysis products are formed by the directing effect of the hollow space system. The products show different colors as a function of the pyrolysis temperature. Thus yellow, red, green and brown shades could be obtained.

Without further elaboration, it is believed that one skilled in the art can, using the preceding description, utilize the present invention to its fullest extent. The preferred specific embodiments are, therefore, to be construed as merely illustrative, and not limitative of the disclosure in any way whatsoever.

The entire disclosure of all applications, patents and publications, cited above and below, and of corresponding German No. P 42 06 553.4, are hereby incorporated by reference.

EXAMPLES

EXAMPLE 1

0.8 g of pyrogenic silica of the composition $SiO_2$ were stirred together with 0.04 g of finely milled dodecasil 1 H clathrasil crystals, which served as seed crystals and are hereinafter designated as $SiO_2$ (seed crystals), 0.4 g of 1-adamantylamine and 23.4 ml of 32% by weight ammonia at room temperature for 1 minute.

The reaction batch had the following molar composition:

1 $SiO_2 \times 0.05$ $SiO_2$ (seed crystals) $\times 0.2$ 1-adamantylamine $\times 60$ $H_2O \times 29$ $NH_3$ At a heating rate of 0.5 K./min and a final temperature of 453 K., perfect dodecasil 1 H clathrasil crystals having an average size of $8\pm2$ μm were obtained after 144 hours.

EXAMPLE 2

0.8 g of pyrogenic silica of the composition $SiO_2$ were stirred together with 0.12 g of finely milled dodecasil 1 H clathrasil crystals, which served as seed crystals and are hereinafter designated as $SiO_2$ (seed crystals), 0.4 g of 1-adamantylamine and 23.4 ml of 32% by weight ammonia at room temperature for 1 minute.

The reaction batch had the following molar composition:

1 $SiO_2 \times 0.15$ $SiO_2$ (seed crystals) $\times 0.2$ 1-adamantylamine $\times 60$ $H_2O \times 29$ $NH_3$ At a heating rate of 0.5 K./min and a final temperature of 453 K., perfect dodecasil 1 H clathrasil crystals having an average size of $4\pm1$ μm were obtained after 144 hours.

EXAMPLE 3 a) 0.8 g of pyrogenic silica of the composition $SiO_2$, 1.47 g of 1-adamantylamine and 23.4 ml of 32% by weight ammonia were stirred at room temperature for 1 minute.

The reaction batch had the following molar composition:

1 $SiO_2 \times 0.73$ 1-adamantylamine $\times 60$ $H_2O \times 29$ $NH_3$

At a heating rate of 0.5 K./min and a final temperature of 453 K., perfect dodecasil 1 H clathrasil crystals were obtained after 144 hours and were finely milled in a vibrating mill, after which the average particle size ranged from 0.2 to 1.5 μm.

b) 0.8 g of pyrogenic silica of the composition $SiO_2$ were stirred together with 0.08 g of finely milled dodecasil 1 H clathrasil crystals from the adamantyl batch according to Example 3 a), which served as seed crystals and are hereinafter designated as $SiO_2$ (seed crystals), 1.2 g of triethylammonium bromide and 23.4 ml of 32% by weight ammonia at room temperature for 1 minute.

The reaction batch had the following molar composition:

1 $SiO_2 \times 0.1$ $SiO_2$ (seed crystals) $\times 0.5$ TEAMBr $\times 60$ $H_2O \times 29$ $NH_3$ At a heating rate of 0.5 K./min and a final temperature of 453 K., intergrown dodecasil 1 H clathrasil crystals having an average size ranging from 5 to 10 μm were obtained after 144 hours.

EXAMPLE 4

0.8 g of pyrogenic silica of the composition $SiO_2$ were stirred together with 0.08 g of finely milled dodecasil 1 H clathrasil crystals (from the adamantyl batch according to Example 3 a)), which served as seed crystals and are hereinafter designated as $SiO_2$ (seed crystals), 4 g of sodium dodecylsulphate and 23.4 ml of 32% by weight ammonia at room temperature for 1 minute.

The reaction batch had the following molar composition:

1 $SiO_2 \times 0.1$ $SiO_2$ (seed crystals) $\times 1.0$ Na DDS $\times 60$ $H_2O \times 29$ $NH_3$ At a heating rate of 0.5 K./min and a final temperature of 453 K., intergrown dodecasil 1 H clathrasil crystals having an average size of between 5 and 10 μm were obtained after 144 hours.

EXAMPLE 5

0.8 g of pyrogenic silica of the composition $SiO_2$ were stirred together with 0.08 g of finely milled dodecasil 1 H clathrasil crystals (from an adamantyl batch according to Example 3a)), which served as seed crystals and are hereinafter designated as $SiO_2$ (seed crystals), 0.3 g of 1-adamantylamine and 23.4 ml of 32% by weight ammonia at room temperature for 1 minute.

The reaction batch had the following molar composition:

1 $SiO_2 \times 0.1$ $SiO_2$ (seed crystals)$\times 0.4$ 1-adamantylamine$\times 60$ $H_2O \times 29$ $NH_3$ At a heating rate of 0.5 K./min and a final temperature of 453 K., intergrown dodecasil 1 H clathrasil crystals having an average size of between 5 and 10 μm were obtained after 144 hours.

An analogous batch without addition of seed crystals:

1 $SiO_2 \times 0.4$ 1-adamantylamine$\times 60$ $H_2O \times 29$ $NH_3$ led to complete conversion only after a reaction time of 240 hours at a heating rate of 0.5 K./min and a final temperature of 453 K., giving intergrown dodecasil 1 H clathrasil crystals having an average size of between 180 and 270 μm.

EXAMPLE 6

0.8 g of pyrogenic silica of the composition $SiO_2$, 1.47 g 1-adamantylamine and 23.4 ml of 32% by weight ammonia were stirred at room temperature for 1 minute. The reaction batch had the following molar composition:

1 $SiO_2 \times 0.7$ 1-adamantylamine$\times 60$ $H_2O \times 29$ $NH_3$

At a heating rate of 0.5 K./min and a final temperature of 453 K., perfect dodecasil 1 H clathrasil crystals having an average size of 200 μm were obtained after 144 hours. The crystals were heated at a heating rate of 10 K./min to the respective pyrolysis temperature for 30 minutes.

The results are given in the following table:

| pyrolysis temperature [K] | color |
|---|---|
| 773 | colorless |
| 873 | red |
| 1023 | green |
| 1173 | brown |
| >1273 | black |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modification of the invention to adapt it to various usages and conditions.

What is claimed is:

1. A process for the preparation of a crystalline clathrasil having a dodecasil 1 H structure, comprising heat-treating an alkaline aqueous silicate-containing medium containing a template and crystallization seeds, the crystallization seed content, relative to the $SiO_2$ content of the medium, being not less than 1% by weight, wherein the medium is heated at a substantially linear heating rate to a final temperature, the heating rate being 0.1 to 20 K./min and the final temperature being 400 to 480 K., whereby the dodecasil has an average crystal size of not more than 20 μm.

2. A process according to claim 1, wherein the crystallization seeds used are finely milled dodecasil 1 H clathrasil crystals.

3. A process according to claim 1, wherein the template is a quaternary ammonium compound, an amine, a surfactant, or an alcohol.

4. A process according to claim 1, wherein the medium additionally contains a colorant which is incorporated in the clathrate structure.

5. A process according to claim 4, wherein the medium contains an organic colorant.

6. A process according to claim 5, wherein the organic colorant is methylene blue, methyl orange, bromocresol purple, malachite green or phenol red.

7. A process according to claim 1, wherein the medium has an $NH_3$ content of 15 to 45 and an $H_2O$ content of 40 to 70, in each case relative to the number of moles of $SiO_2$.

8. A platelet-shaped, crystalline clathrasil having a dodecasil 1 H structure and an average crystal size of not more than 20 μm.

9. A platelet-shaped pigment comprising a clathrasil according to claim 8, optionally containing an incorporated colorant and optionally additionally coated with one or more metal oxide layers.

10. In a plastic, paint, or cosmetic comprising a pigment, the improvement wherein the pigment is one of claim 10.

11. A clathrasil produced by the process of claim 1.

12. A process according to claim 1, wherein the crystallization seed content is more than 1%.

13. A process according to claim 1, wherein the crystallization seed content is not less than 2%.

14. A process according to claim 1, wherein the crystallization seed content is not less than 5%.

15. A process according to claim 1, wherein the crystallization seed content is 5–10%.

* * * * *